United States Patent
Bright et al.

(10) Patent No.: US 6,400,947 B1
(45) Date of Patent: Jun. 4, 2002

(54) CALLER LINE IDENTIFICATION FOR GSM AND WIRELESS COMMUNICATIONS SYSTEMS

(76) Inventors: Penny Lynne Bright, 1112 Needham Rd., Naperville, IL (US) 60563; Anne Stickley Michel, 732 Chateaugay Ave., Naperville, IL (US) 60540; Christopher John Lloyd, 206 Thornbury Ct., Oswego, IL (US) 60543; Martin E. Lake, 1S560 Verdun Dr., Winfield, IL (US) 60190

(*) Notice: Subject to any disclaimer, the term of this patent is extended or adjusted under 35 U.S.C. 154(b) by 0 days.

(21) Appl. No.: 09/035,403

(22) Filed: Mar. 5, 1998

(51) Int. Cl.[7] .................. H04M 1/66; H04M 11/10; H04M 3/42; H04M 7/20; H04M 1/00
(52) U.S. Cl. .................. 455/433; 455/410; 455/412; 455/415; 455/432; 455/560; 455/428; 455/411
(58) Field of Search .................. 455/432, 433, 455/434, 435, 458, 410, 411, 412, 560, 415, 428

(56) References Cited

U.S. PATENT DOCUMENTS

| | | | | |
|---|---|---|---|---|
| 5,319,699 A | * | 6/1994 | Kerihuel et al. | 379/58 |
| 5,561,840 A | * | 10/1996 | Alvesalo et al. | 455/33.1 |
| 5,621,783 A | * | 4/1997 | Lantto et al. | 379/59 |
| 5,815,810 A | * | 9/1998 | Gallant et al. | 455/433 |
| 5,828,959 A | * | 10/1998 | Soderbacka | 455/445 |
| 5,839,072 A | * | 11/1998 | Chien | 455/445 |
| 5,857,011 A | * | 1/1999 | Kennedy et al. | 379/32 |
| 5,867,567 A | * | 2/1999 | Itoh | 379/142 |
| 5,873,030 A | * | 2/1999 | Mechling et al. | 455/408 |
| 5,890,063 A | * | 3/1999 | Mills | 455/433 |
| 5,898,506 A | * | 4/1999 | Itoh | 358/434 |
| 5,920,820 A | * | 7/1999 | Qureshi et al. | 455/461 |
| 5,926,533 A | * | 7/1999 | Gainsboro | 379/188 |
| 5,937,049 A | * | 8/1999 | Brady | 379/210 |
| 5,943,621 A | * | 8/1999 | Ho et al. | 455/456 |
| 5,953,663 A | * | 9/1999 | Maupin et al. | 455/433 |
| 5,956,717 A | * | 9/1999 | Kraay et al. | 707/10 |
| 5,963,912 A | * | 10/1999 | Katz | 705/7 |
| 5,978,673 A | * | 11/1999 | Alperovich et al. | 455/417 |

* cited by examiner

Primary Examiner—Daniel Hunter
Assistant Examiner—Meless Zewdu

(57) ABSTRACT

In a wireless GSM communication network, caller data can be collected at a central location and centrally stored, regardless of the operating state of the phone being called. The GSM gateway mobile switching center can collect caller data and forward it to the GSM home location register database for subsequent processing. In an alternate embodiment, the terminating mobile switching center can collect the caller data.

35 Claims, 1 Drawing Sheet

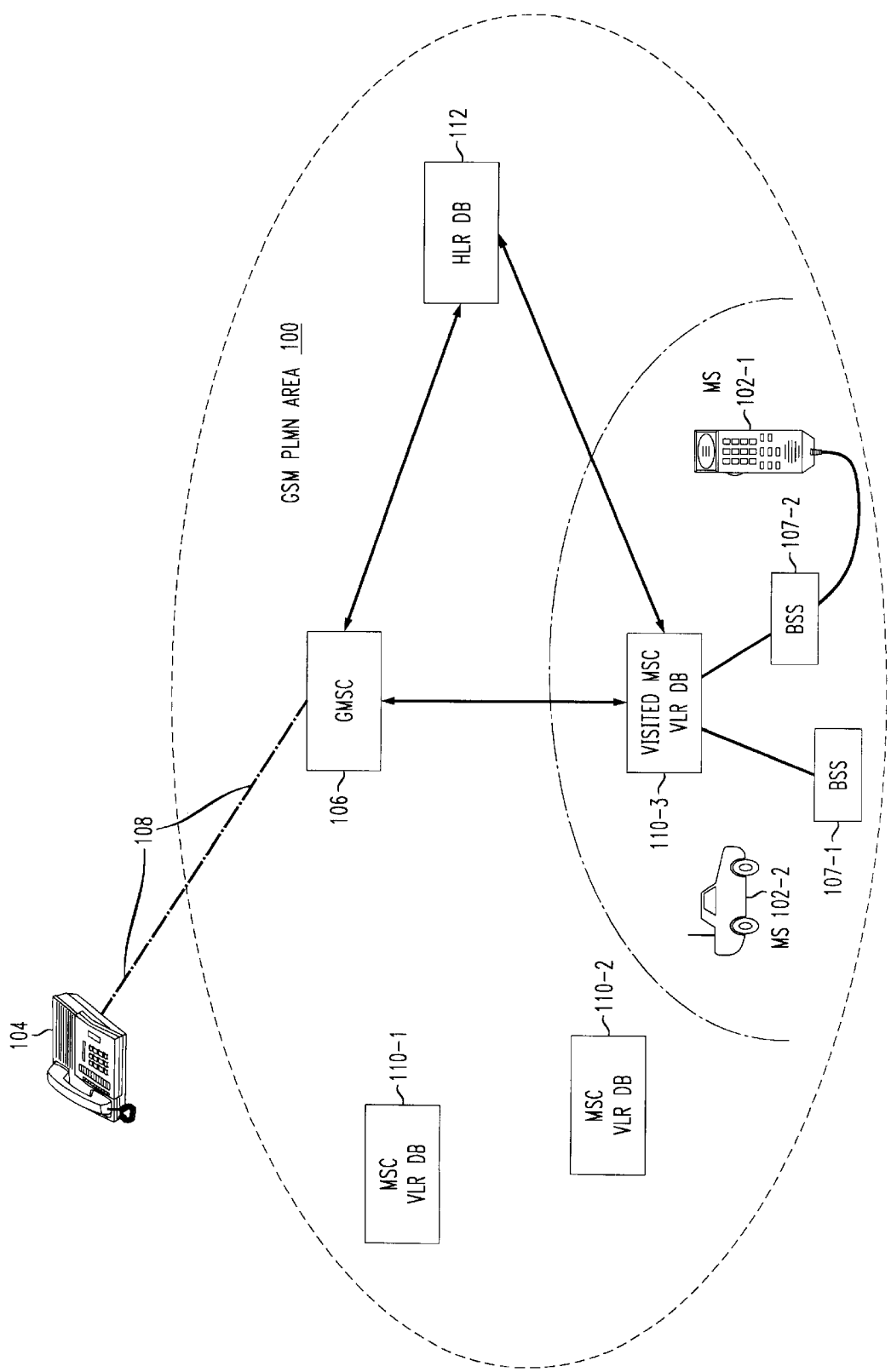

US 6,400,947 B1

CALLER LINE IDENTIFICATION FOR GSM AND WIRELESS COMMUNICATIONS SYSTEMS

FIELD OF THE INVENTION

This invention relates to wireless communication systems. In particular, this invention relates to cellular systems and in particular global system for mobile communications (hereafter "GSM") wireless systems.

BACKGROUND OF THE INVENTION

GSM wireless systems are widespread. These systems now offer features like caller identification or caller ID, call waiting, call forwarding, and other valuable and useful features. Unfortunately, wireless communication systems are sometimes used to further illegal activities. Knowing the phone numbers called by a GSM mobile station or phone (hereafter "MS") can sometimes be valuable to law enforcement agencies for a variety of reasons. Compiling the phone numbers dialed by the MS is a relatively straightforward task.

On the other hand, recording data about inbound calls to an MS is considerably more difficult than recording outbound calls in part because inbound calls to an MS might enter a wireless network of a wireless service provider through a plethora of paths. Inbound calls to an MS can originate from anywhere.

When a caller dials an MS phone number, call processing software in switching systems operated by telephone service providers, route the call to the wireless service provider. The wireless service provider then routes the call to the wireless subscriber through equipment that comprises the wireless network.

A method and apparatus by which calls to an MS in a wireless network can be recorded and compiled might provide law enforcement agencies with valuable information. It might also allow for improved diagnosis of service complaints. Collecting data on inbound calls to an MS could also provide the capability of screening or intercepting inbound calls from particular numbers.

Accordingly, it is an object of the present invention to provide a method and apparatus to provide inbound call trace capability to a wireless indication network.

SUMMARY OF THE INVENTION

There is provided a method and apparatus for collecting data on inbound calls to a wireless subscriber. In a wireless communication system, such as the GSM wireless system, calls to an MS are routed through at least one central switching system, known as a gateway mobile switching center (GMSC) that is operatively coupled to several, mobile switching centers (MSCs). MSCs are spread across the geographic area in which the GSM wireless service is offered. Each MSC provides the GSM wireless communication functionality to the geographic region surrounding the MSC. The GMSC and the MSCs make up the GSM public lands mobile network (PLMN).

A call to an MS in a GSM PLMN is first processed in part by the GMSC querying a central database to identify a particular MSC that the wireless subscriber is closest to. The home location register database (HLR) in a GSM PLMN is a central repository of data pertaining to wireless subscribers. Locating the MS in the GSM PLMN is accomplished in part by the GMSC communicating with the HLR to learn the identity of the subscribers within its coverage area.

Wireless-subscriber-caller data, (i.e. data on calls to a particular wireless subscriber) collected by the GMSC is forwarded to the HLR database for subsequent processing or other presentation or use. The wireless-subscriber-caller data can alternatively be sent to aid other processors for subsequent delivery to the HLR database or some other appropriate database as well.

BRIEF DESCRIPTION OF THE DRAWINGS

FIG. 1 is a simplified block diagram of the GSM wireless indication system joined functional elements of a network for practicing invention disclosed herein.

DETAILED DESCRIPTION OF THE PREFERRED EMBODIMENT

FIG. 1 shows a simplified block diagram of a "Global System for Mobile Communication" or GSM wireless communication network. The GSM wireless network subscriber uses a phone that is known as a "mobile station" or MS (102) that can make and receive phone calls within the geographic coverage area of the GSM PLMN (100).

Incoming calls to GSM subscribers are routed to one or more gateway mobile switching centers (GMSCs) (106) by telephone service providers (108). One GMSC (106) within aGSM PLMN (100) is shown in FIG. 1. Alternate embodiments of the invention would include using a GMSC located in a network from which a call is originated.

Several mobile switching centers (MSC's) are coupled to the GMSC. The mobile switching centers (MSCs) have many base station systems (BSS) (107) connected to them that provide the wireless link between the MS (102) and the PLMN (100) that comprise the GSM system. Stated alternatively, MSCs provide the wireless communication portion of the GSM service to the surrounding geographic areas in which mobile stations are located.

The home location register (HLR) database (112) in GSM is typically a data file co-located with a processor that is part of a switching network such as the Lucent Technologies, Inc. No. 5 ESS switch. In alternate embodiments, the HLR might be comprised of a suitably capable processor coupled to appropriate data storage media such as a magnetic disk. The HLR database contains information on a subscriber's eligibility for wireless service, the types of service, and service features, that each subscriber might be entitled to.

A visitor location register (VLR) data base resides on the MSC. The VLR contains MS location information and feature and use information copied from the HLR.

When a subscriber powers up a GSM MS to which wireless communication is to take place, a data exchange or handshake takes place between the MS, the BSS, and the MSC providing switching service to the area where the MS is located. Among other things, the MSC communicates with the subscribers phone during this log-on procedure and thereafter knows that the radio is within the particular MSC's switching jurisdiction (area). The MSC/VLR and HLR exchange database information about the MS. The HLR downloads the subscriber's type of service and service features to the MSC/VLR. The MSC/VLR forwards data about the MS to the HLR where the data is accessible to the GMSC.

Before a call can be routed to an MS (102), the GMSC retrieves a mobile station roaming number (MSRN), i.e. a temporary phone number to call the MS with, or a forward-to-number from the HLR database that stores data on the GSM subscribers. If the HLR does not have a forward-tonumber, it queries the VLR for a MSRN which the HLR returns to the GMSC. The GMSC uses the MSRN or forward-to-number to route the call.

It is now commonplace in land-line phone systems to collect data from a phone that is placing a call. So-called caller ID information is routinely forwarded to a party being called. This data on the identity of a calling party may include the time the call is placed.

In the preferred embodiment of the invention, the aforementioned wireless-subscriber caller data is received at the GMSC (106) from the switching system that routed the call to the GSM PLMN (100). This wireless subscriber caller data is collected at the GMSC and then forwarded to the HLR database (112) where it is stored. Other embodiments of the invention would include collecting the caller data at the MSC (110) or GMSC (106) and then sending the caller data to the HLR (112).

In the prior art, caller identification data is delivered to the MSC (110) of the wireless subscriber only if the wireless subscriber's MS is turned on within a GSM PLMN. Using this invention, the called subscriber MS can query the HLR to retrieve collected data from the HLR if the called wireless subscriber's MS was turned off, not reachable by the visiting MSC, or was other inaccessible when the call was attempted because the GMSC sends data to the HLR regardless of the MS being off, not reachable or inaccessible.

In the invention disclosed herein, all wireless subscriber caller data can be passed to the HLR database for subsequent processing that might include printing, analysis or other presentation. Wireless subscriber caller data is available at or through the HLR database for a variety of purposes including service complaint diagnosis, call screening, or other purposes that might assist law enforcement in identifying illicit activity.

Those of skilled in the art will recognize that the invention can be practiced by collecting wireless subscriber caller data at the gateway mobile switching center and compiling the data at the GMSC or elsewhere to prevent its loss. Compilation of the wireless subscriber caller data might take place within the gateway mobile switching center itself or by another processor either co-located or removed from the GMSC. Compiled data may be sent away from the GMSC to the home location register database which is a constituent part of GSM systems.

It is now practical and many telephone service providers offer a service that allows telephone subscribers to forward incoming calls to another telephone. By using the aforementioned method and apparatus, it may also be desirable to collect information from calls placed to a wireless subscriber that includes the identity of phones that are forwarding calls to the wireless subscriber. Collecting information related to the phone number for which calls are forwarded to a wireless subscriber would allow the telephone service provider to know that incoming calls to the MS phone originate elsewhere.

By collecting information on incoming calls, it is possible for wireless subscriber to screen or reject calls from particular numbers. Using well-known call processing techniques, calls that originate from particular numbers might be directed to a pre-recorded message or simply be rejected.

By knowing a phone number of incoming call, it is also possible to route such call to a particular destination. For example, calls from a particular number owned by hearing impaired subscribers might be routed to appropriate equipment to enable the phone call to take place. Similarly foreign speaking caller's might have their calls routed to a phone number in the network where they may be received or answered by someone capable of understanding their language.

In the preferred embodiment the HLR will record the date and time that it receives wireless-subscriber-caller data from the GMSC. Alternate embodiments would include collecting data at the GMSC (106) or MSC (110) that includes: the time that a call was placed by the calling party; the identity of the calling, forwarding, and called parties; and the identity of the GMSC. Such information would be sent to the HLR and might be useful in diagnosing service complaints or in documenting usage of the wireless network.

By use of the foregoing method and apparatus, data on calls to a wireless subscriber can be collected regardless of the operational condition of the subscriber's mobile station. Even if a mobile station is powered off, data on calls to the mobile station can be collected. Wireless subscribers can thereby avoid lost calls. Annoyance or harassing calls can be screened; service complaints might be more readily diagnosed; law enforcement agencies seeking to obtain information on suspected criminal activity might be able to obtain such information.

The following code defines the protocol of the mobile application part message called "SEND ROUTING INFORMATION" or SRI which carries the wireless-subscriber-caller data (highlighted in boldface below). This message is sent from the GMSC to the HLR.

---

Abstract Syntax Notation (ASN.1) of the Mobile Application Part (MAP) - Send Routing Information Operation

---

```
MAP-Protocol {
    cciff identifled-organization (4) etsi (0) mobileDomain (0)
    gsm-Network (1) modules (3) map-Protocol (4) version2 (2)}
    DEFINITIONS
    ::=
    BEOIN
    IMPORTS
        SendRoutingInfo
        FROM MAP-CallHandlingOperations {
    ccitt identified-organization (4) etsi (0) mobileDomain (0)
    gsm-Network (1) modules (3) map-CallHandlingOperations (7)
    version2 (2) }
;
MAP-CallHandlingOperations {
    ccitt identified-organization (4) etsi (0) mobileDomain (0)
```

-continued

Abstract Syntax Notation (ASN.1) of the Mobile Application Part (MAP) - Send Routing Information Operation

```
      gsm-Network (1) modules (3) map-CallHandlingOperations (7)
      version2 (2)}
DEFINITIONS
::=
BEGIN
EXPORTS
      SendRoutingInfo,
;
SendRoutingInfo ::= OPERATION
Timer m
      ARGUMENT
            sendRoutingInfoArg          SendRoutingInfoArg
      RESULT
            sendRoutingInfoRes          SendRoutingInfoRes
      ERRORS {
            SystemFailure,
            DataMissing,
            UnexpectedDataValue,
            FacilityNotSupported,
            UnknownSubscriber,
            NumberChanged,
            -- NumberChanged must not be used in version 1
      BearerServiceNotProvisioned,
            TeleserviceNotProvisioned,
            AbsentSubscriber,
            CallBarred,
            CUG-Reject,
            -- CUG-Reject must not be used in version 1
            ForwardingViolation}
      SendRoutingInfoArg ::= SEQUENCE {
            msisdn                      [0] ISDN-AddressString,
            cug-CheckInfo               [1] CUG-CheckInfo
      OPTIONAL,
            -- cug-CheckInfo must be absent in version 1
            numberOffForwarding         [2] NumberOfForwarding
      OPTIONAL,
            networkSignalInfo           [10] ExternalSignalInfo
      OPTIONAL,
            ...,
            callingNumber               [PRIVATE 29] ISDN-
      AddressString OPTIONAL,
            redirectingNumber           [PRIVATE 26] ISDN-
      AddressString OPTIONAL}
      Fully Expanded ASN. 1 Source of MAP-Protocol
      sendRoutingInfo OPERATION
            ARGUMENT
               sendRoutingInfoArg SEQUENCE {
                  msisdn  [0] IMPLICIT OCTET STRING (SIZE (1..9)
                  cug-CheckInfo [1] IMPLICIT SEQUENCE {
                     cug-Interlock OCTET STRING (SIZE (4)),
                     cug-OutgoingAccess NULL OPTIONAL,
                     ... } OPTIONAL,
                  numberOfForwarding [2] IMPLICIT INTBGER (1..5) OPTIONAL,
                  networkSignalInfo [10] IMPLICIT SEQUENCE {
                     protocolId ENUMERATED {
                        gsm-0408      (1),
                        gsm-0806      (2),
                        gsm-BSSMAP (3),
                        ets-300102-1 (4)},
                     signalInfo OCTET STRING (SIZE (1..200)),
                     ...
                  } OPTIONAL,
                  ...,
                  callingNumber [PRIVATE 29] IMPLICIT OCTET STRING
      (SIZE(1..9)) OPTIONAL,
                  redirectingNumber [PRIVATE 30] IMPLICIT OCTET STRING
      (SIZE(1..9)) OPTIONAL}
      RESULT
            sendRoutingInfoRes SEQUENCE {
                  imsi    OCTET STRING (SIZE (3..8)),
                  routingInfo CHOICE {
                     roamingNumber OCTET STRING (SIZE (1..9)),
                     forwardingData SEQUENCE {
                        forwardedToNumber [5] IMPLICIT OCTET STRING (SIZE (1..9))
      OPTIONAL,
                        forwardedToSubaddress [4] IMPLICIT OCTET STRING (SIZE
```

-continued

Abstract Syntax Notation (ASN.1) of the Mobile Application Part (MAP) - Send Routing Information Operation

```
            (1..21)) OPTIONAL,
                 forwardingOptions [6] IMPLICIT OCTET STRING (SIZE (1))
       OPTIONAL,
                 ... } },
            cug-CheckInfo SEQUENCE {
                 cug-Interlock OCTET STRING (SIZE (4)),
                 cug-OutgoingAccess NULL OPTIONAL,
            ... } OPTIONAL,
       ... }
     ERRORS {
         -- systemFailure -- localValue 34,
         -- dataMissing-- localValue 35,
         -- unexpectedDataValue -- localValue 36,
         -- facilityNotSupported -- localValue 21,
         -- unknownSubscriber-- localValue 1,
         -- numberChanged-- localValue 44,
         -- bearerServiceNotProvisioned -- localValue 10,
         -- teleserviceNotProvisioned-- localValue 11,
         -- absentSubscriber-- localValue 27,
         -- callBarred-- localValue 13,
         -- cug-Reject-- localValue 15,
         -- forwardingViolation-- localValue 14}
       :: = localValue 22
-- call handling operation code
sendRoutingInfo SendRoutingInfo ::= localValue 22
```

We claim:

1. A method for use of a wireless communications network comprised of; i) at least one gateway mobile switching center that routes calls to a wireless communication subscriber in a wireless communication network; and ii) a home location register wireless subscriber database for storing information related to wireless subscribers; said method for using comprising the steps of:

collecting wireless-subscriber-caller data at said gateway mobile switching center;

prior to sending said wireless-subscriber-caller data to said home location register wireless subscriber database, querying said home location register wireless subscriber database to determine a mobile station roaming number of a wireless subscriber;

sending said wireless-subscriber-caller data from said gateway mobile switching center to said home location register wireless subscriber database;

storing said wireless-subscriber-caller data from said gateway mobile switching center in said home location register wireless subscriber database;

wherein the wireless-subscriber-caller data is caller data for a call directed to the wireless communication subscriber.

2. The method of claim 1 further including the step of: querying said home location register wireless subscriber database.

3. The method of claim 1 further including the step of: collecting wireless-subscriber-caller data when said wireless called subscriber's mobile station is inaccessible.

4. The method of claim 1 further including the step of: collecting information related to a phone number from which calls are forwarded to said wireless communication subscriber.

5. The method of claim 1 further comprised of the steps of:

collecting information related to a phone number from which calls are forwarded to said wireless communication subscriber; and sending said information related to a phone number from which calls are forwarded to said home location register database.

6. The method of claim 1 wherein said step of storing said wireless-subscriber caller data from said gateway mobile switching center in said home location register wireless subscriber database includes the step of: storing said wireless-subscriber caller data in a file.

7. The method of claim 1 further including the step of querying said home location register wireless subscriber database to retrieve wireless-subscriber-caller data from said home location register wireless subscriber database for processing data stored in said home location register wireless subscriber database.

8. The method of claim 1 further comprised of the step of analyzing wireless-subscriber-caller data from said home location register wireless subscriber database at said home location register.

9. The method of claim 1 further comprised of the step of screening calls to a wireless subscriber using said wireless-subscriber caller data stored in said home location register wireless subscriber database.

10. The method of claim 1 further comprised of the step of rejecting calls to a wireless subscriber using said wireless-subscriber caller data stored in said home location register wireless subscriber database.

11. The method of claim 1 further comprised of the step of routing calls to a wireless subscriber to a predetermined destination using said wireless-subscriber caller data stored in said home location register wireless subscriber database.

12. The method of claim 1 further comprised of the step of printing said wireless-subscriber caller data from said home location register database.

13. A method for use of a wireless communications network comprised of: i) at least one gateway mobile switching center that routes calls to a wireless communication subscriber in a wireless communication network; and ii) a home location register wireless subscriber database containing information related to wireless subscribers; said method for use comprising the steps of:

collecting wireless-subscriber-caller data at said gateway mobile switching center;

prior to sending said wireless-subscriber-caller data to said home location register wireless subscriber database, querying the home location register subscriber database to locate a wireless communication subscriber and to determine a mobile station roaming number of the wireless subscriber;

sending the wireless-subscriber-caller data to the home location register subscriber database;

storing the wireless-subscriber-caller data within the home location register subscriber database;

wherein the wireless-subscriber-caller data is caller data for a call directed to the wireless communication subscriber.

14. The method of claim 13 further including the step of:

collecting information related to a phone number from which calls are forwarded to said wireless communication subscriber.

15. The method of claim 13 further comprised of the steps of:

collecting information related to a phone number from which calls are forwarded to said wireless communication subscriber; and sending said information related to a phone number from which calls are forwarded to said home location register database.

16. The method of claim 13 further including the step of storing information related to a phone number from which calls are forwarded to said wireless subscriber.

17. A method for use of a wireless communications network comprised of: i) at least one gateway mobile switching center that routes calls to a wireless communication subscriber in a wireless communication network; and ii) a home location register wireless subscriber database containing information related to wireless subscribers; said method for use comprising the steps of:

collecting wireless-subscriber-caller data at said gateway mobile switching center;

sending said collected wireless-subscriber-caller data to said home location register wireless subscriber database;

prior to sending said wireless-subscriber-caller data to said home location register wireless subscriber database, querying said home location register database for the location of said wireless subscriber in said network and to determine a mobile station roaming number of the wireless subscriber;

storing said wireless-subscriber caller data from said gateway mobile switching center in said home location register wireless subscriber database;

wherein the wireless-subscriber-caller data is caller data for a call directed to the wireless communication subscriber.

18. The method of claim 17 further including the step of:

collecting information related to a phone number from which calls are forwarded to said wireless communication subscriber.

19. The method of claim 17 further comprised of the steps of:

collecting information related to a phone number from which calls are forwarded to said wireless communication subscriber; and sending said information related to a phone number from which calls are forwarded to said home location register database.

20. The method of claim 17 further including the steps of:

a collecting information related to a phone number from which calls are forwarded to said wireless communication subscriber at said gateway mobile switching center; and sending said information related to a phone number from which calls are forwarded to said home location register database.

21. The method of claim 17 further including the step of:

storing said information related to a phone number from which calls are forwarded to said wireless communication subscriber at said home location register database.

22. The method of claim 17 further including the step of: routing a call to a particular subscriber based in part upon the phone number of a party calling said wireless subscriber.

23. The method of claim 17 further including the step of intercepting a call to a wireless subscriber based in part upon the phone number of a party calling said wireless subscriber.

24. A method for use of a wireless communications network comprised of: i) a wireless communication subscriber in a wireless communication network; ii) a home location register wireless subscriber database for storing information related to wireless subscribers; and iii) at least one mobile switching center, said method for use comprising the steps of:

collecting wireless-subscriber-caller data at said mobile switching center;

prior to sending said wireless-subscriber-caller data to said home location register wireless subscriber database, querying said home location register wireless subscriber database to determine a mobile station roaming number of a wireless subscriber;

sending said wireless-subscriber-caller data from said mobile switching center to said home location register database;

storing said wireless-subscriber-caller data from said mobile switching center in said home location register subscriber database;

wherein the wireless-subscriber-caller data is caller data for a call directed to the wireless communication subscriber.

25. The method of claim 24 further comprised of the steps of:

collecting information related to a phone number from which calls are forwarded to said wireless communication subscriber; and sending said information related to a phone number from which calls are forwarded to said home location register database.

26. A wireless communications network providing wireless communication services to a plurality of wireless service subscribers, said network comprised of:

at least one gateway mobile switching center (gateway) routing calls to wireless communication subscribers in said wireless communication network;

a home location register wireless subscriber database that stores wireless-subscriber-caller data collected by said at least one gateway mobile switching center and responds to queries for a mobile station roaming number of a wireless subscriber prior to receiving said wireless-subscriber-caller data;

wherein the wireless-subscriber-caller data is caller data for a call directed to the wireless communication subscriber.

27. The network of claim 26 further comprised of: at least one mobile switching center, operatively coupled to said home location register wireless subscriber database and to said at least one gateway mobile switching center.

28. The network of claim 26 wherein said home location register wireless subscriber database is comprised of a processor.

29. A wireless communications network providing wireless communication services to a plurality of wireless service subscribers, said network comprised of:
   at least one gateway mobile switching center that routes calls to wireless communication subscribers in said wireless communication network;
   a home location register wireless subscriber database operatively coupled to said at least one gateway mobile switching center that stores wireless-subscriber-caller data and responds to queries for a mobile station roaming number of a wireless subscriber prior to receiving said wireless-subscriber-caller data;
   wherein the wireless-subscriber-caller data is caller data for a call directed to the wireless communication subscriber.

30. A method for use of a wireless communications network comprised of: i) at least one gateway mobile switching center that routes calls to a wireless communication subscriber in a wireless communication network; and ii) a home location register wireless subscriber database storing information related to wireless subscribers; said method for use comprising the steps of:
   collecting wireless-subscriber-caller data at said gateway mobile switching center;
   prior to sending said wireless-subscriber-caller data to said home location register wireless subscriber database, querying said home location register wireless subscriber database to determine a mobile station roaming number of a wireless subscriber;
   sending said wireless-subscriber-caller data from said gateway mobile switching center to said home location register wireless subscriber database;
   storing said wireless-subscriber-caller data in said home location register wireless subscriber database;
   printing wireless-subscriber-caller data from said home location register wireless subscriber database;
   wherein the wireless-subscriber-caller data is caller data for a call directed to the wireless communication subscriber.

31. The method of claim 30 further including the step of:
   collecting information related to a phone number from which calls are forwarded to said wireless communication subscriber.

32. The method of claim 30 further comprised of the steps of:
   collecting information related to a phone number from which calls are forwarded to said wireless communication subscriber; and
   sending said information related to a phone number from which calls are forwarded to said home location register database.

33. A method for use of a wireless communications network comprised of: i) at least one gateway mobile switching center that routes calls to a wireless communication subscriber in a wireless communication network; and ii) a home location register wireless subscriber database for storing information related to wireless subscribers; said method for use comprising the steps of:
   collecting wireless-subscriber-caller data at said gateway mobile switching center;
   prior to sending said wireless-subscriber-caller data to said home location register wireless subscriber database, querying said home location register wireless subscriber database to determine a mobile station roaming number of a wireless subscriber;
   sending said wireless-subscriber-caller data from said gateway mobile switching center to said home location register wireless subscriber database;
   analyzing wireless-subscriber-caller data from said home location register wireless subscriber database at said home location register;
   wherein the wireless-subscriber-caller data is caller data for a call directed to the wireless communication subscriber.

34. A method for use of a wireless communications network comprised of: i) at least one gateway mobile switching center that routes calls to a wireless communication subscriber in a wireless communication network; and ii) a home location register wireless subscriber database for storing information related to wireless subscribers; said method for use comprising the steps of:
   collecting wireless-subscriber-caller data at said gateway mobile switching center;
   prior to sending said wireless-subscriber-caller data to said home location register wireless subscriber database, querying said home location register wireless subscriber database to determine a mobile station roaming number of a wireless subscriber;
   sending said wireless-subscriber-caller data from said gateway mobile switching center to said home location register wireless subscriber database;
   storing said wireless-subscriber-caller data in said home location register wireless subscriber database.
   screening calls to a wireless subscriber using data in said home location register database;
   wherein the wireless-subscriber-caller data is caller data for a call directed to the wireless communication subscriber.

35. A method for use of a wireless communications network comprised of: i) at least one gateway mobile switching center that routes calls to a wireless communication subscriber in a wireless communication network; and ii) a home location register wireless subscriber database for storing information related to wireless subscribers; said method for use comprising the steps of:
   collecting wireless-subscriber-caller data at said gateway mobile switching center;
   prior to sending said wireless-subscriber-caller data to said home location register wireless subscriber database, querying said home location register wireless subscriber database to determine a mobile station roaming number of a wireless subscriber;
   sending said wireless-subscriber-caller data from said gateway mobile switching center to said home location register wireless subscriber database;
   storing said wireless-subscriber-caller data in said home location register wireless subscriber database;
   rejecting calls to a wireless subscriber using data in said home location register wireless subscriber database;
   wherein the wireless-subscriber-caller data is caller data for a call directed to the wireless communication subscriber.

* * * * *

UNITED STATES PATENT AND TRADEMARK OFFICE
CERTIFICATE OF CORRECTION

PATENT NO. : 6,400,947 B1
DATED : June 4, 2002
INVENTOR(S) : Bright et al.

It is certified that error appears in the above-identified patent and that said Letters Patent is hereby corrected as shown below:

<u>Title page,</u>
Insert item [73] to read as follows:

-- [73] Assignee: Lucent Technologies Inc. --

Signed and Sealed this

Eighth Day of April, 2003

JAMES E. ROGAN
*Director of the United States Patent and Trademark Office*